(12) United States Patent
Chen

(10) Patent No.: US 7,755,858 B2
(45) Date of Patent: Jul. 13, 2010

(54) LENS ASSEMBLY AND LENS MODULE HAVING SAME

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/342,209

(22) Filed: Dec. 23, 2008

(65) Prior Publication Data

US 2009/0310235 A1    Dec. 17, 2009

(30) Foreign Application Priority Data

Jun. 16, 2008    (CN) .................... 2008 1 0302152

(51) Int. Cl.
*G02B 7/02* (2006.01)

(52) U.S. Cl. .................. 359/819; 359/811; 359/820; 359/826; 359/719

(58) Field of Classification Search .............. 359/811, 359/819, 820, 796, 822, 823, 826, 827, 814, 359/813, 719; 348/335, 360
See application file for complete search history.

(56) References Cited

U.S. PATENT DOCUMENTS

| 5,612,826 | A  | * | 3/1997 | Ohshita ................... 359/819 |
| 6,072,634 | A  | * | 6/2000 | Broome et al. ............ 359/637 |
| 6,813,103 | B2 | * | 11/2004 | Tansho et al. ............. 359/819 |
| 7,088,530 | B1 | * | 8/2006 | Recco et al. .............. 359/811 |
| 7,196,855 | B2 | * | 3/2007 | Yamaguchi ............... 359/785 |
| 2009/0086342 | A1 | * | 4/2009 | Seki ......................... 359/820 |

* cited by examiner

*Primary Examiner*—Loha Ben
(74) *Attorney, Agent, or Firm*—Clifford O. Chi

(57) ABSTRACT

A lens assembly includes a first lens and a second lens. The first lens includes a first optically active portion, a first optically inactive portion surrounding the first optically active portion and a first optical axis. The first optically inactive portion includes a first inclined surface relative to the first optical axis. The second lens includes a second optically active portion, a second optically inactive portion and a second optical axis. The second optically inactive portion includes a second inclined surface relative to the second optical axis. The second lens is coupled to the first lens in such a manner that the first inclined surface is in contact with the second inclined surface, and a gap is maintained between the second optically inactive portion of the second lens and the first optically inactive portion of the first lens.

18 Claims, 4 Drawing Sheets

LENS ASSEMBLY AND LENS MODULE HAVING SAME

BACKGROUND

1. Technical Field

The present invention relates to a lens assembly and a lens module utilizing the same.

2. Description of Related Art

With the ongoing development of microcircuitry and multimedia technology, portable cameras are in widespread use, and must maintain standards of compactness and optical performance.

Lens modules are key components of the cameras. A typical lens module includes a lens barrel and a number of components arranged therein, such as lenses, spacers and filters. Generally, the components are compacted together in the lens barrel. The lens module then undergoes a temperature cycling test or a thermal shock test. However, as lenses are sensitive to different temperatures, and stress tends to occur between the lenses in such a compact situation in the temperature cycling test or thermal shock test. Accordingly, an optical resolution of the lens module will be lowered after the test.

What is needed, therefore, is a lens module which can minimize stress therein.

BRIEF DESCRIPTION OF THE DRAWINGS

Many aspects of the lens module and the method can be better understood with reference to the following drawings. The components in the drawings are not necessarily drawn to scale, the emphasis instead being placed upon clearly illustrating the principles of the present lens module and method. Moreover, in the drawings, like reference numerals designate corresponding parts throughout the several views.

DETAILED DESCRIPTION OF THE EMBODIMENTS

Figure 1:
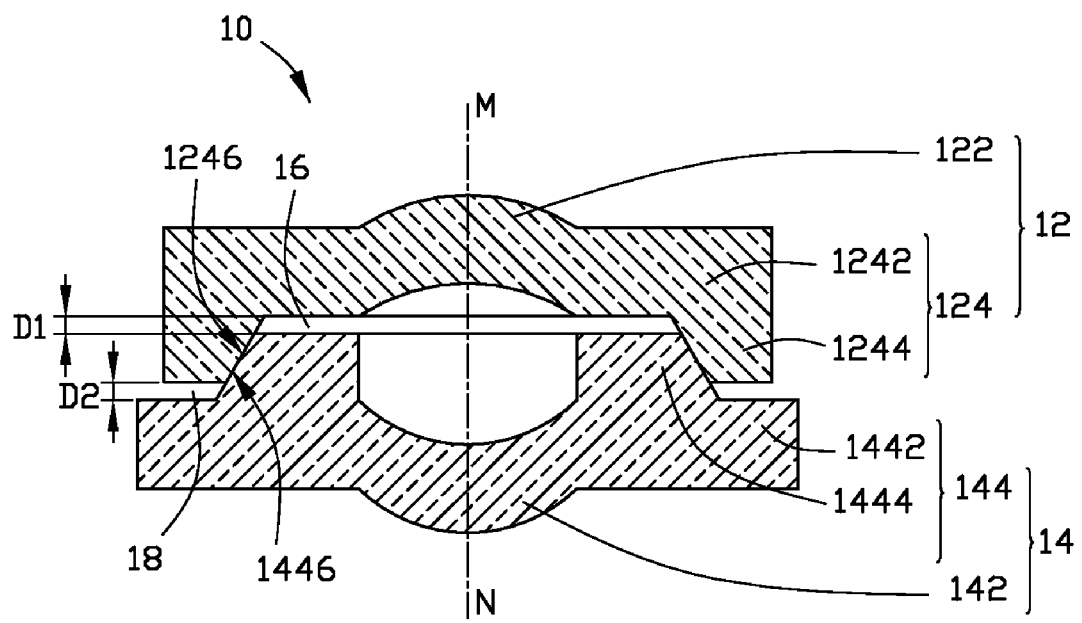
FIG. 1 is a cross section of a lens assembly according to a first embodiment.

Referring to FIG. 1, a lens assembly 10 according to a first embodiment, including a first lens 12 and a second lens 14, is shown.

The first lens 12 includes a first optically active portion 122, a first optically inactive portion 124, and an optical axis MN. The first optically inactive portion 124 includes a first base 1242 and a first flange 1244 protruding therefrom. The first flange 1244 includes a first inclined surface 1246 relative to the optical axis MN. An angle formed between the optical axis MN and the first inclined surface 1246 is from about 100 to about 120 degrees (°). Particularly, the angle from 105 to 115°.

The second lens 14 includes a second optically active portion 142, and a second optically inactive portion 144. The second lens 14 has the same optical axis as first lens 12. The second optically inactive portion 144 includes a second base 1442 and a second flange 1444 protruding therefrom. The second flange 1444 includes a second inclined surface 1446 relative to the optical axis MN. An angle formed between the optical axis MN and the second inclined surface 1446 is from about 100 to about 120°. Particularly, the angle is from 105 to 115°.

The second lens 14 is coupled to the first lens 12 in such a manner that the first inclined surface 1246 is in contact with the second inclined surface 1446. In this position, a first gap 16 is cooperatively defined by the first base 1242 and the second flange 1444. A distance D1 between the first base 1242 and the second flange 1444 at the first gap 16 is about 5 to 100 micrometers (μm). Particularly, the distance D1 is 10 to 50 μm. At the same time, a second gap 18 is cooperatively defined by the second base 1442 and the first flange 1244. A distance D2 between the second base 1442 and the first flange 1244 at the second gap 18 is about 5 to 100 μm. Particularly, the distance D2 is 10 to 50 μm. It should be noted that the distance D1 can be different from the distance D2.

Because the second lens 14 is coupled to the first lens 12 using the first and the second inclined surfaces 1246, 1446, precise optical alignment of the first and second lenses 12, 14 can be achieved. Furthermore, the first and the second inclined surfaces 1246, 1446 facilitate assembly of the second lens to the first lens 12.

Figure 2:
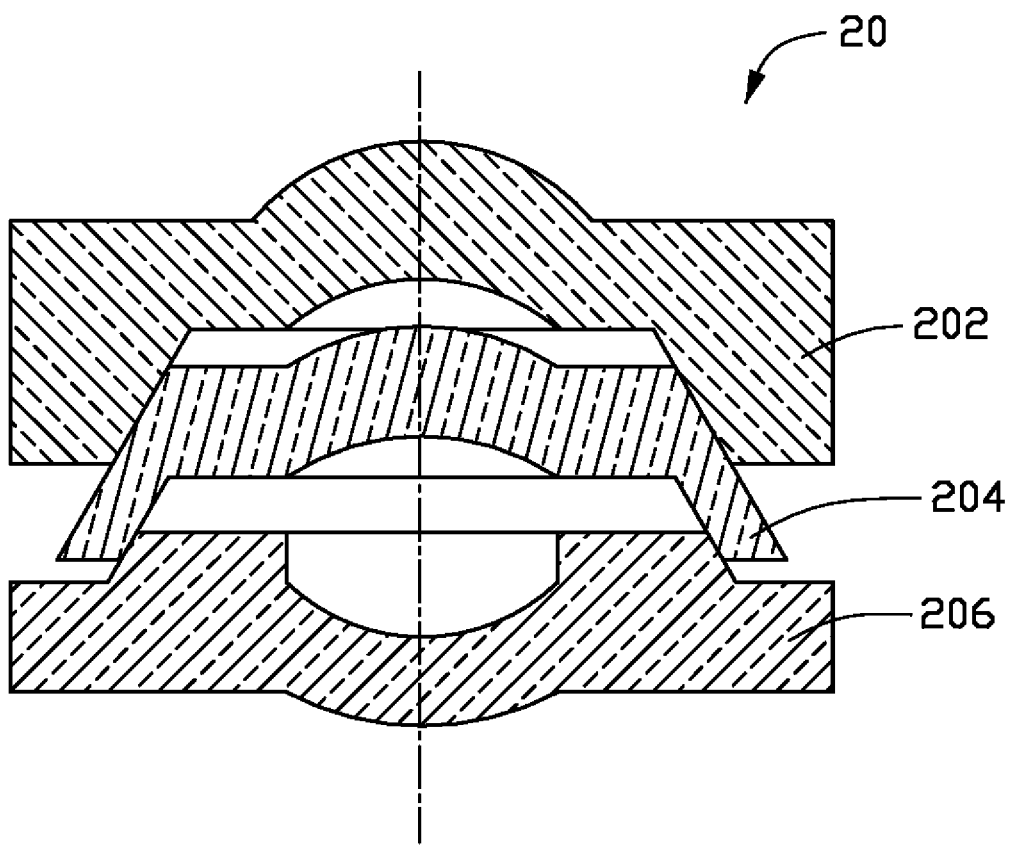
FIG. 2 is a cross section of a lens assembly according to a second embodiment.

Referring to FIG. 2, a lens assembly 20 according to a second embodiment is shown, differing from lens assembly 10 of FIG. 1 only in that lens assembly 20 includes three lenses 202, 204, 206.

Figure 3:
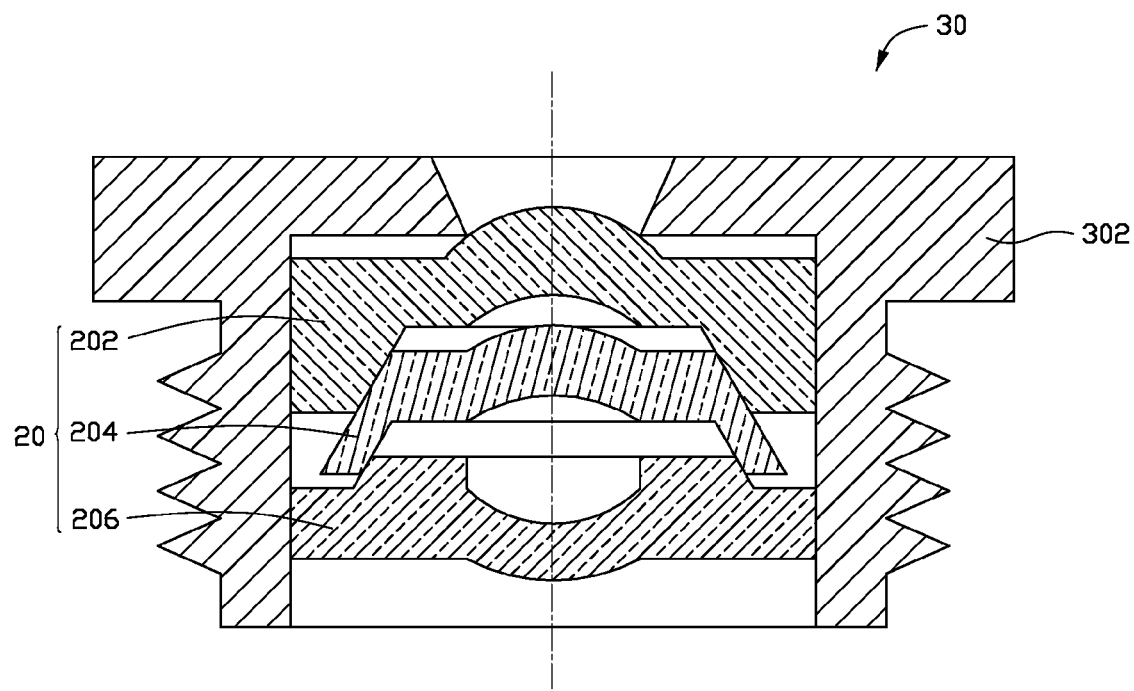
FIG. 3 is a cross section of a lens module according to a third embodiment.

Referring to FIG. 3, a lens module 30 according to a third embodiment is shown. The lens module 30 includes a barrel 302 and a lens assembly 20 received therein.

Figure 4:
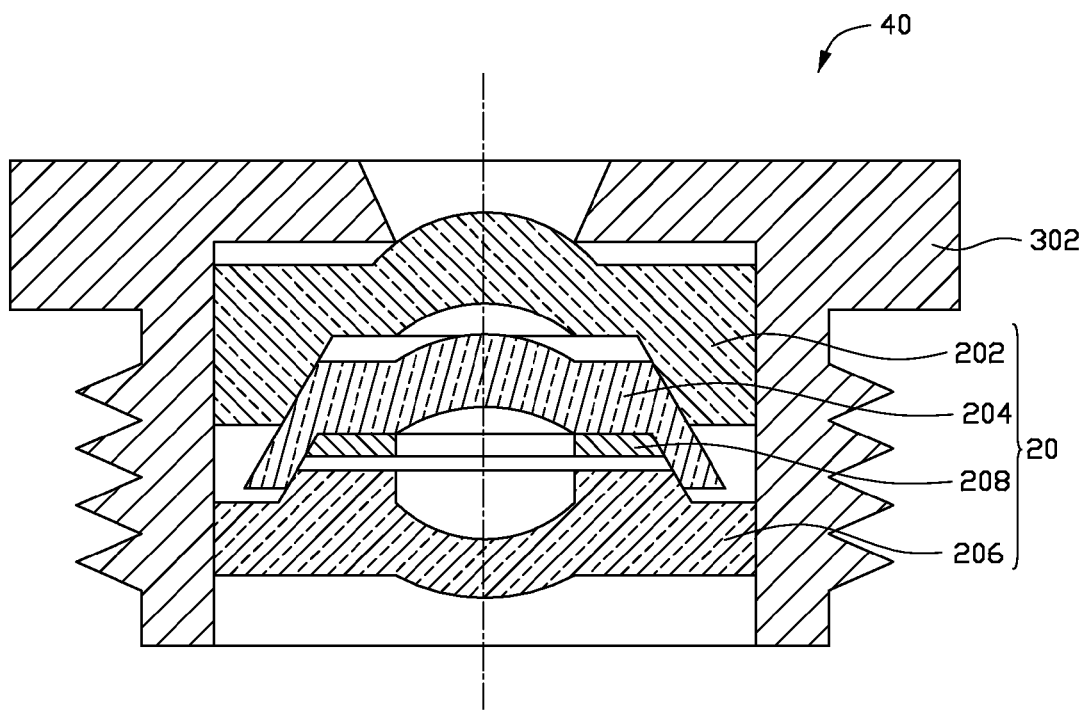
FIG. 4 is a cross section of a camera module according to a fourth embodiment.

Referring to FIG. 4, a lens module 40 according to a fourth embodiment is shown, differing from lens module 30 of FIG. 3 only in that lens module 40 further includes a spacer 208 disposed between the second lens 204 and the third lens 206. The spacer 208 is in contact with the second lens 204. A gap is maintained between the spacer 208 and the third lens 206.

It is understood that the described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens assembly comprising:
   a first lens including a first optically active portion, a first optically inactive portion surrounding the first optically active portion, and a first optical axis, the first optically inactive portion comprising a first inclined surface inclined relative to the first optical axis; and
   a second lens including a second optically active portion, a second optically inactive portion, and a second optical axis, the second optically inactive portion comprising a second inclined surface inclined relative to the second optical axis, the second lens being coupled to the first lens, wherein the first inclined surface is in contact with the second inclined surface, a gap is maintained between the second optically inactive portion of the second lens and the first optically inactive portion of the first lens, and a distance between the first optically inactive portion and the second optically inactive portion at the gap is in the range from about 5 μm to about 100 μm.

2. The lens assembly of claim 1, wherein the first optically inactive portion comprises a first base portion and a first flange protruding from the first base portion, the first inclined surface is a surface of the first flange, the second optically inactive portion comprises a second base portion and a second flange protruding from the second base portion, the second inclined surface is a surface of the second flange, and the gap is defined between the first base portion and the second flange.

3. The lens assembly of claim 1, wherein the first optically inactive portion comprises a first base portion and a first flange protruding from the first base portion, the first inclined surface is a surface of the first flange, the second optically inactive portion comprises a second base portion and a second flange protruding from the second base portion, the second inclined surface is a surface of the second flange, and the gap is defined between the first flange and the second base portion.

4. The lens assembly of claim 1, wherein the first optical axis aligns with the second optical axis.

5. The lens assembly of claim 1, wherein an angle formed between the first inclined surface and the first optical axis is in the range from about 100° to about 120°.

6. The lens assembly of claim 5, wherein the angle formed between the first inclined surface and the first optical axis is in the range from about 105° to about 115°.

7. The lens assembly of claim 1, wherein an angle formed between the second inclined surface and the second optical axis is in the range from about 100° to about 120°.

8. The lens assembly of claim 7, wherein the angle formed between the second inclined surface and the second optical axis is in the range from about 105° to about 115°.

9. The lens assembly of claim 1, wherein the distance between the first optically inactive portion and the second optically inactive portion at the gap is in the range from about 10 μm to about 50 μm.

10. A lens module comprising:
a barrel;
a first lens received in the barrel, the first lens including a first optically active portion,
a first optically inactive portion and a first optical axis, the first optically inactive portion comprising a first inclined surface inclined relative to the first optical axis; and
a second lens received in the barrel, the second lens including a second optically active portion, a second optically inactive portion and a second optical axis, the second optically inactive portion comprising a second inclined surface inclined relative to the second optical axis, the second lens being coupled to the first lens in such a manner that the first inclined surface is in contact with the second inclined surface, a gap is maintained between the second optically inactive portion of the second lens and the first optically inactive portion of the first lens, and a distance between the first optically inactive portion and the second optically inactive portion at the gap is in the range from about 5 μm to about 100 μm.

11. The lens module of claim 10, wherein the first optically inactive portion comprises a first base portion and a first flange protruding from the first base portion, the first inclined surface is a surface of the first flange, the second optically inactive portion comprises a second base portion and a second flange protruding from the second base portion, the second inclined surface is a surface of the second flange, and the gap is defined between the first base portion and the second flange.

12. The lens module of claim 10, wherein the first optically inactive portion comprises a first base portion and a first flange protruding from the first base portion, the first inclined surface is a surface of the first flange, the second optically inactive portion comprises a second base portion and a second flange protruding from the second base portion, the second inclined surface is a surface of the second flange, and the gap is defined between the first flange and the second base portion.

13. The lens module of claim 10, wherein the first optical axis aligns with the second optical axis.

14. The lens module of claim 10, wherein an angle formed between the first inclined surface and the first optical axis is in the range from about 100° to about 120°.

15. The lens module of claim 14, wherein the angle formed between the first inclined surface and the first optical axis is in the range from about 105° to about 115°.

16. The lens module of claim 10, wherein an angle formed between the second inclined surface and the second optical axis is in the range from about 100° to about 120°.

17. The lens module of claim 16, wherein the angle formed between the second inclined surface and the second optical axis is in the range from about 105° to about 115°.

18. The lens module of claim 10, wherein the distance between the first optically inactive portion and the second optically inactive portion at the gap is in the range from about 10 μm to about 50 μm.

* * * * *